J. A. WAVRIN.
GAGE FOR SELECTING ARTIFICIAL TEETH.
APPLICATION FILED JULY 30, 1919.
1,378,745.
Patented May 17, 1921.
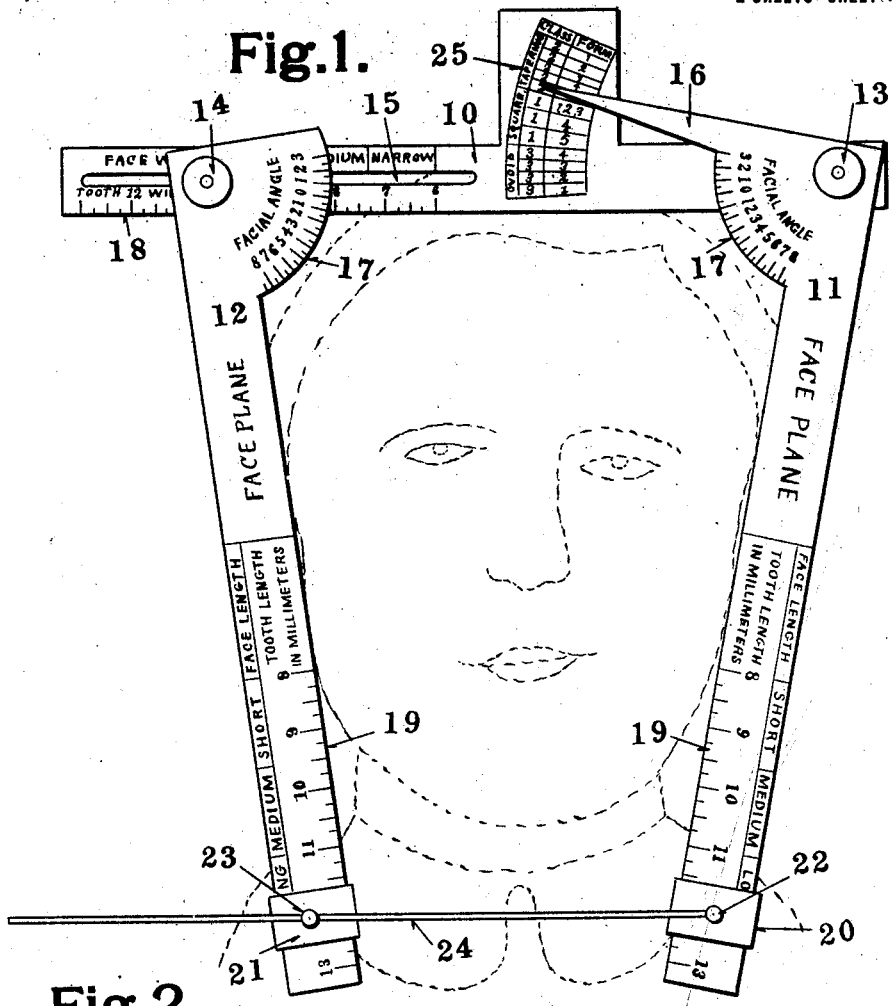
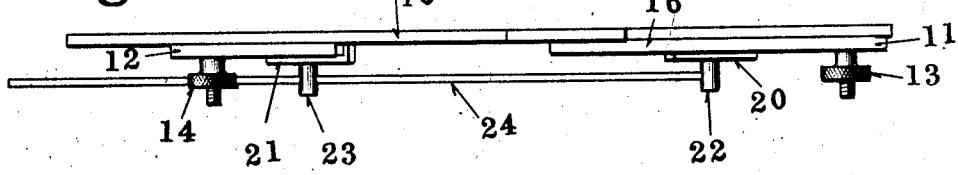
INVENTOR
J.A.Wavrin
BY E.E.Huffman
ATTORNEY J. A. WAVRIN.
GAGE FOR SELECTING ARTIFICIAL TEETH.
APPLICATION FILED JULY 30, 1919.
1,378,745.
Patented May 17, 1921.
2 SHEETS—SHEET 2.
Fig.3.
Fig.4.
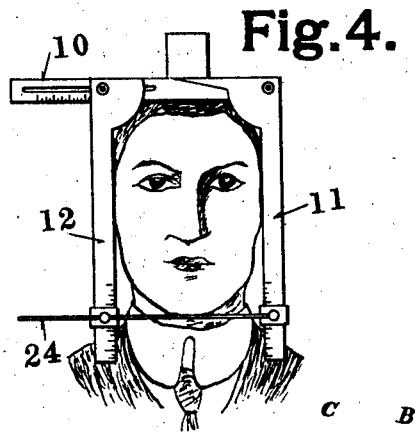
Fig.5
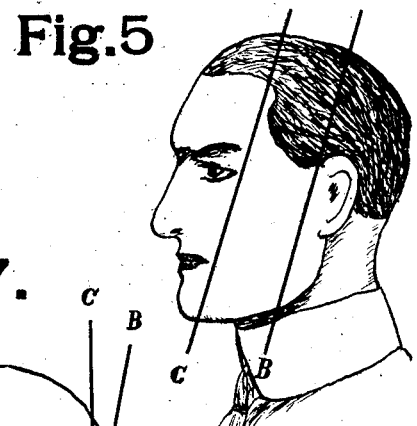
Fig.6.
Fig.7.
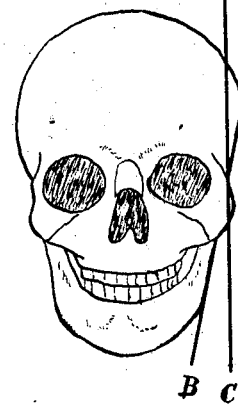
INVENTOR
J.A.Wavrin
BY E.E.Huffman
ATTORNEY

UNITED STATES PATENT OFFICE.

JOHN A. WAVRIN, OF ST. LOUIS, MISSOURI, ASSIGNOR TO DENTISTS' SUPPLY COMPANY, A CORPORATION OF NEW YORK.

GAGE FOR SELECTING ARTIFICIAL TEETH.

1,378,745.   Specification of Letters Patent.   Patented May 17, 1921.

Application filed July 30, 1919. Serial No. 314,313.

*To all whom it may concern:*

Be it known that I, JOHN A. WAVRIN, a citizen of the United States of America, residing at the city of St. Louis, State of Missouri, United States of America, have invented a certain new and useful Gage for Selecting Artificial Teeth, of which the following is such a full, clear, and exact description as will enable any one skilled in the art to which it appertains to make and use the same, reference being had to the accompanying drawings, forming part of this specification.

My invention relates to a tooth gage and more particularly to improvements in that form of tooth gage shown and described in application Serial No. 291,676, filed April 21, 1919, by William C. Dalbey.

One of the objects of my invention is to provide a tooth gage of the type above referred to with means for securing equal angles between the adjustable face blades and the cross bar to which they are attached so that accurate reading of the indicator scale on the cross bar is obtained. Another object of my invention is to provide the cross bar with a scale coöperating with the adjustable sliding face blade to indicate tooth widths. Another object is to provide the face blades with an adjustable sliding cross bar coöperating with scales on the said face blades to indicate tooth lengths.

In the accompanying drawings which illustrate one form of tooth gage made in accordance with my invention, Figure 1 is a front elevation, Fig. 2 is a top plan view, Fig. 3 is a diagrammatic view illustrating the object of the invention, and Figs. 4 to 7 are diagrammatic views illustrating the manner of using the gage.

Referring first to Figs. 1 and 2, 10 is a cross bar to which are pivoted face blades 11 and 12 adapted to be clamped in position by thumb nuts 13 and 14 respectively. The pivot of the face blade 12 passes through a slot 15 so that this face blade may be moved longitudinally of the cross bar 10. The face blade 11 is provided with a pointer 16 coöperating with a chart 25 to indicate the class and form of teeth. In order to secure equal angles between the cross bar 10 and the two face blades 11 and 12, I provide each of said face blades with a graduated arc 17 adapted to be read in conjunction with the lower edge of the cross bar 10. The cross bar 10 is also provided with a scale 18 adapted to be read in conjunction with the edge of the face blade 12 to indicate tooth widths, as will be hereinafter more particularly pointed out. The face blades 11 and 12 are provided with scales 19. Sliding on the face blades 11 and 12 are blocks 20 and 21 provided with pivoted studs 22 and 23 respectively. 24 is a cross bar which is rigidly secured in a stud 22 and passes slidingly through the stud 23. The edges of the blocks 20 and 21 are adapted to coöperate with the scales 19 on the face blades to indicate tooth lengths.

The operation of the device depends upon the fact that to secure harmony in artificial dentures, it is essential that the upper central incisor (inverted) must exhibit the same general form as the face and be proportionate thereto. By applying the gage, as will be hereinafter set forth, such proportion and form of incisor will be indicated from which it is possible to determine the best form and size of the entire set of teeth. In Fig 3, the heavy line A indicates the form of upper central incisor harmonious with the type of face exhibited in this drawing.

In using the device, the thumb nuts 13 and 14 are loosened sufficiently to allow the face blades 11 and 12 to swing on their pivots. The face blades are then applied to the sides of the face, each blade passing along a line about one inch anterior to the tragus of the ear and angle of the jaw. It should rest just posterior to the zygoma tubercle and mandibular groove for facial artery. The groove is palpable along the lower border of mandible. The position of the face blade is indicated diagrammatically by the lines B in Figs. 5 and 7. In Fig. 6 are indicated three typical forms of facial angles. The angles lying between lines B B and B' B' require tapering teeth, those between B' B' and B² B² square teeth, and those between B² B² and B³ B³ ovoid teeth. By means of the graduated arcs 17, the same angle is secured between the two face blades 11 and 12 and the cross bar 10 to insure accurate reading of the chart 25. The arms 16 of the plate 11 will indicate upon the chart 25 the class and form of tooth required. In case the indicator 16 falls upon one of the lines of the scale, the next lower mold should be used for fleshy patients, the one above for thin patients. After the class and form of tooth is thus indicated the two face blades are placed at right angles to the cross bar 10 as shown in Fig. 4 and the blade 12 is moved along cross bar 10 toward the blade 11 until the blade edges rest against the side of the face in the position indicated by the lines C in Figs. 5 and 7. Each face blade should be best adjusted to follow in a line from the corner of the eye to the base of the chin. This line will pass the lower external posterior ridge of the malar bone and terminate below the mental process. With the blades in this position and the cross bar 10 resting upon the top of the head, the blocks 20 and 21 are moved upwardly along the base blades 11 and 12 until the bar 24 carried thereby rests against the chin. The tooth length can now be read on either of the scale 19 of blades 11 and 12 and the tooth width may be read upon the scale 18 on the cross bar. These scales may be graduated to any suitable unit of measure. I prefer, however, to use the metric measure and to graduate the scales to one-fourth millimeter.

Referring again to the manner of determining the length and width of the tooth which is to be selected for a given face, it will be seen from examination of Fig. 3 that the general tooth outline A corresponds to the shape of the face and it will, therefore, be manifest that the vertical height of the face as well as the width thereof may be respectively taken as approximate functions of the height and width of the tooth form required. With this as a basis, the vertical adjustment of the bar 24 upward to the chin will cause the sliding blocks 20 and 21 to take a position along the scales 19 on the face blades 11 and 12 which will indicate the length characteristics of the tooth required. This manipulation is indicated in Fig. 4. In respect to the width of the tooth required, this is also indicated by the adjustment shown in Fig. 4 where the face blade 12 is adjusted along the scale 18 which contains the measurements corresponding to the width of the tooth and the characteristics thereof which would be required for a face of a given width. These scales 18 and 19, as well as the scale 25 for designating the tooth form have all been carefully computed so that they are fair and reasonable approximations of the tooth requirements of any particular face when the instrument forming the subject matter of this invention has been properly adjusted to the face, as hereinbefore described.

It will now be apparent that I have devised a novel and useful construction which embodies the features of advantage enumerated as desirable, and while I have in the present instance shown and described the preferred embodiment thereof which has been found in practice to give satisfactory and reliable results, it is to be understood that I do not restrict myself to the details, as the same are susceptible of modification in various particulars without departing from the spirit or scope of the invention.

Having fully described my invention, what I claim as new and desire to secure by Letters Patent of the United States is:

1. A tooth gage for determining shapes and sizes of artificial teeth to be used in dentures, the combination with a cross bar of a pair of face blades pivoted to said cross bar, one of said face blades also sliding relative to said cross bar, means for securing equal angles between said cross bar and the two face blades, a tooth conformation chart carried by the cross bar, and an indicator actuated by one of said face blades for traversing the chart in determining the tooth conformation suitable for the particular shaped face to which the gage is applied.

2. The invention according to claim 1, further characterized by having a scale on the cross bar coöperating with the other of said face blades to indicate tooth width to be selected.

3. The invention according to claim 1, wherein the face blades are provided with scales along their length, and a sliding transverse bar is adjustably carried by the face blades and coöperating with the scales thereon for determining the tooth length to be selected.

4. A tooth gage for determining shapes and sizes of artificial teeth to be used in dentures, comprising a bar adapted to fit to the upper part of the head, two face blades adjustably connected with the said bar whereby they may be adjustable relatively to and from each other and also assume various angles relatively to each other, a tooth conformation chart, means traversing the same in operable relation with respect to the frame and one of the face blades to indicate the proper tooth conformation required by the relative adjustments of said parts when applied to the head of the patient, and a scale to indicate the width of the tooth required in operative relation between the bar and the face blades, whereby the relative adjustment of the two face blades to or from each other will determine the width of the tooth required for the patient.

5. The invention according to claim 4, further characterized by the addition of a scale and a vertical gage portion in operative relation with respect to the frame, whereby the vertical length of the tooth required by the patient may be determined.

6. The invention according to claim 5, wherein the scale and gage portion are carried by the face blade structures and the gage is adjustable to or from the frame to which the face blades are attached.

In testimony whereof, I have hereunto set my hand and affixed my seal.

JOHN A. WAVRIN. [L. S.]